(12) United States Patent
Taniguchi et al.

(10) Patent No.: US 7,880,358 B2
(45) Date of Patent: *Feb. 1, 2011

(54) ROTOR OF PERMANENT MAGNET ROTATING ELECTRIC MACHINE

(75) Inventors: Tsukasa Taniguchi, Hitachi (JP); Hiroyuki Mikami, Hitachinaka (JP); Satoshi Kikuchi, Hitachi (JP); Fumio Jyoraku, Hitachiohta (JP); Hideyuki Harada, Hitachi (JP)

(73) Assignee: Hitachi, Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/788,031

(22) Filed: May 26, 2010

(65) Prior Publication Data

US 2010/0231078 A1 Sep. 16, 2010

Related U.S. Application Data

(63) Continuation of application No. 12/169,258, filed on Jul. 8, 2008, now Pat. No. 7,768,171, which is a continuation of application No. 10/523,778, filed as application No. PCT/JP03/10147 on Aug. 8, 2003, now Pat. No. 7,417,348.

(30) Foreign Application Priority Data

Aug. 9, 2002 (JP) ............................. 2002-232264

(51) Int. Cl.
H02K 1/27 (2006.01)

(52) U.S. Cl. ............................. 310/156.53; 310/156.56

(58) Field of Classification Search ............ 310/156.53, 310/156.81
See application file for complete search history.

(56) References Cited

U.S. PATENT DOCUMENTS

| | | | |
|---|---|---|---|
| 4,476,408 A | 10/1984 | Honsinger | |
| 4,922,152 A | 5/1990 | Gleghorn et al. | |
| 5,097,166 A * | 3/1992 | Mikulic | 310/156.83 |
| 5,117,553 A * | 6/1992 | Kliman | 29/598 |
| 5,684,352 A | 11/1997 | Mita et al. | |
| 5,811,904 A | 9/1998 | Tajima et al. | |
| 5,838,086 A | 11/1998 | Cuenot et al. | |
| 5,864,191 A | 1/1999 | Nagate et al. | |
| 5,962,944 A | 10/1999 | Narita et al. | |
| 6,208,054 B1 * | 3/2001 | Tajima et al. | 310/156.53 |
| 6,234,767 B1 * | 5/2001 | Takeda et al. | 417/355 |
| 7,417,348 B2 * | 8/2008 | Taniguchi et al. | 310/156.53 |
| 7,768,171 B2 * | 8/2010 | Taniguchi et al. | 310/153.53 |
| 2002/0047434 A1 | 4/2002 | Koharagi et al. | |

(Continued)

FOREIGN PATENT DOCUMENTS

JP  10-014190  1/1998

(Continued)

*Primary Examiner*—Tran N Nguyen
(74) *Attorney, Agent, or Firm*—Crowell & Moring LLP (57) ABSTRACT

A permanent magnet rotating electric machine has a stator provided with a plurality of windings, and a rotor in which magnets are disposed in slots formed in a rotor core along an outer circumference thereof. The rotor core is fixed on a rotary shaft rotating inside the stator, and one magnetic pole is constituted by each group of three or more of the magnets. A total angle occupied by the group of magnets constituting one magnetic pole is in the range of 150 to 165 degrees in terms of an electrical angle.

4 Claims, 10 Drawing Sheets

U.S. PATENT DOCUMENTS

| | | |
|---|---|---|
| 2002/0074887 A1* | 6/2002 | Takano et al. .......... 310/156.53 |
| 2002/0171308 A1* | 11/2002 | Inayama et al. ........ 310/156.43 |
| 2003/0011265 A1 | 1/2003 | Hattori et al. |
| 2003/0080642 A1 | 5/2003 | Mori et al. |
| 2004/0251763 A1 | 12/2004 | Tamaki et al. |
| 2007/0063607 A1 | 3/2007 | Hattori |

FOREIGN PATENT DOCUMENTS

| | | |
|---|---|---|
| JP | 11-04555 | 1/1999 |
| JP | 2000-333391 | 11/2000 |
| JP | 2001-218398 | 8/2001 |
| JP | 2001-218399 | 8/2001 |
| JP | 2002-017075 | 1/2002 |
| JP | 2002-044887 | 2/2002 |

* cited by examiner

PRIOR ART

ROTOR OF PERMANENT MAGNET ROTATING ELECTRIC MACHINE

CROSS REFERENCE TO RELATED APPLICATION

This application is a continuation of U.S. application Ser. No. 12/169,258, filed Jul. 8, 2008, the entire disclosure of which is expressly incorporated by reference herein and which is a continuation of U.S. patent application Ser. No. 10/523,778, filed Oct. 20, 2005 (now U.S. Pat. No. 7,417,348, issued Aug. 26, 2008), the entire disclosure of which is expressly incorporated by reference herein and which is the U.S. National Phase of PCT/JP2003/010147, filed Aug. 8, 2003, which claims priority to Japanese Patent Application No. 2002-232264, filed Aug. 9, 2002, the entire disclosure of which is expressly incorporated by reference herein.

TECHNICAL FIELD

The present invention relates to a rotor of a rotating electric machine employing permanent magnets, and more particularly to a magnet-embedded rotor in which magnets are embedded in a rotor core.

BACKGROUND ART

In the prior art disclosed in JP-A-2002-44887, a rotor is constructed by embedding Nd—Fe—B sintered magnets in a rotor core. The magnets are each in the form of a flat linear plate in a plan view and are arranged such that they are substantially inscribed in an outer circumference of the rotor so as to provide an almost polygonal shape. Further, the magnets are arranged over the whole circumferential of the rotor, and magnetic poles are each constituted by a plurality of magnets grouped in the same number.

In the prior art described above, however, because the magnets are regularly arranged over the whole circumference of the rotor core such that they are inscribed in an outer circumferential circle of the rotor core, the magnetic flux distribution is dispersed to a large extent, and a satisfactory magnetic flux distribution cannot be obtained. Also, the distortion factor of the induced electromotive force waveform is large and the fundamental wave effective value of the induced electromotive force is reduced, whereby the efficiency of a rotating electric machine is deteriorated. Further, the cogging torque is enlarged and the startup current is increased when the rotating electric machine is operated as a motor. It is hence difficult to start the operation in a smooth way. In addition, because the permanent magnets are arranged over the whole circumference of the rotor, the number of magnets used is increased and the cost is pushed up.

With the view of overcoming the disadvantages set forth above, it is an object of the present invention to provide a permanent magnet rotating electric machine which has high efficiency and high performance, and is inexpensive.

DISCLOSURE OF THE INVENTION

To achieve the above object, according to the present invention, in a rotor including permanent magnets and disposed inside a stator provided with a plurality of armature windings, one magnetic pole is constituted by each group of three or more of the magnets, and a total angle occupied by the group of magnets constituting one magnetic pole is in the range of 150 to 165 degrees in terms of an electrical angle. Such an arrangement is effective in not only realizing a satisfactory magnetic flux distribution such that magnetic fluxes are more efficiently concentrated toward the magnetic pole center, but also increasing the fundamental wave effective value of the induced electromotive force, whereby the efficiency of the rotating electric machine is improved. Further, since the magnets of each group are arranged in layout more concentrated toward the magnetic pole center position, the amount of magnets used is reduced and therefore a permanent magnet rotating electric machine can be provided at a lower cost.

Moreover, the magnet arranged on the magnetic pole end side is oriented to incline toward the magnetic pole center position. With this arrangement, since the distortion factor of the induced electromotive force waveform and the cogging torque are both reduced, a current value required for starting up rotation can be reduced and the rotation can be smoothly started up. Further, by setting an inclination angle of the magnet to be in the range of 2 to 6 degrees, the induced electromotive force can be effectively increased and therefore higher performance of the rotating electric machine can be realized.

Preferably, slots in which the magnets are disposed are shaped such that slits are formed between adjacent two of the magnets. With this arrangement, the leakage magnetic flux generated between adjacent two of the magnets is reduced and the utilization efficiency of the magnets can be increased. Further, by sealing a magnet fixing material in the slits, reliability of the rotor can also be increased. Additionally, by using a magnet in the form of a simple flat plate, the magnet cost can be cut.

BEST MODE FOR CARRYING OUT THE INVENTION

Embodiments of a rotating electric machine according to the present invention will be described below with reference to the drawings in connection with the case of the rotating electric machine having two poles.

Figure 1:
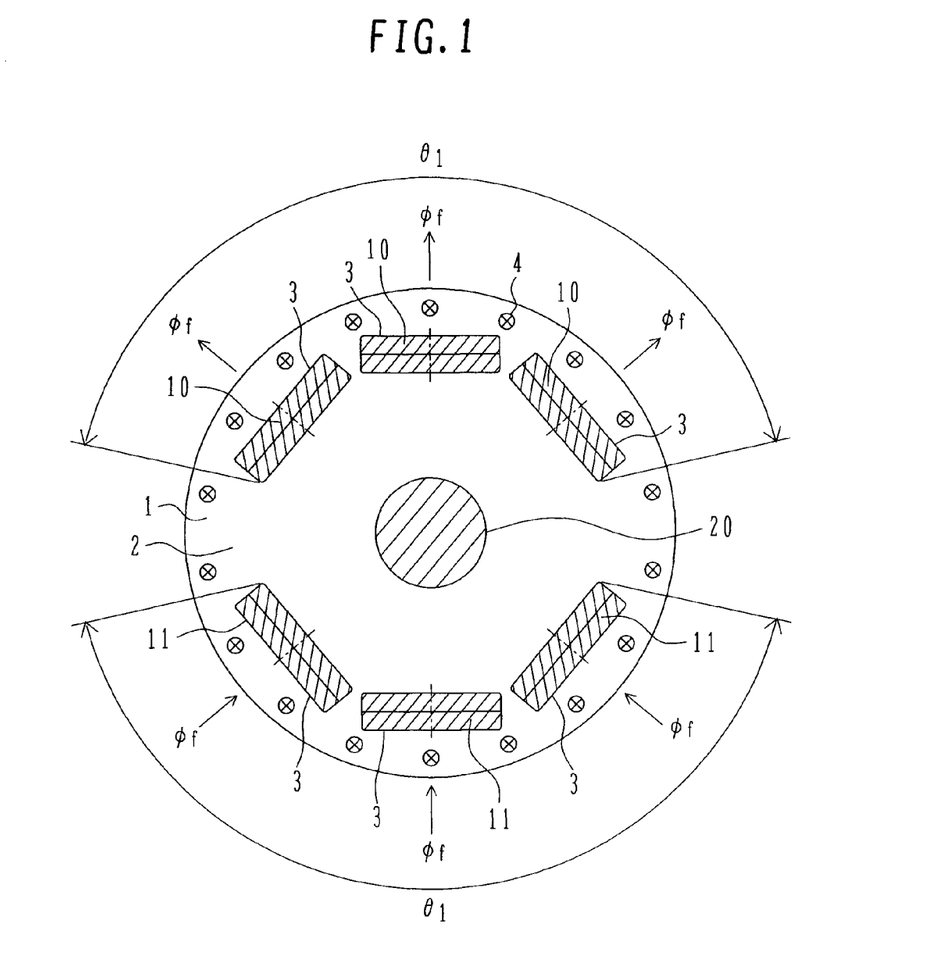
FIG. 1 is a sectional view showing the structure of one embodiment of a rotor of a permanent magnet rotating electric machine according to the present invention.

FIG. 1 shows the structure of a rotor of a permanent magnet rotating electric machine as one embodiment of the rotating electric machine according to the present invention. A rotor 1 comprises a rotor core 2, slots 3 in which magnets are disposed, N-pole permanent magnets 10, S-pole permanent magnets 11, a rotary shaft 20, and a plurality of damper windings 4 circumferentially disposed outside the magnets 10, 11. The rotor core 2 is a cylindrical laminated core formed by laminating a plurality of thin iron sheets one above another, which are each punched in a predetermined shape.

The N-pole permanent magnets 10 and the S-pole permanent magnets 11 are each a magnet generating magnetic flux Φf and are grouped in unit of three magnets per magnetic pole. Those groups of magnets are disposed in slots 3 formed in the rotor core 2 near its outer circumferential surface so as to constitute two magnetic poles, and the slots 3 are arranged such that three slots receiving each group of magnets are relatively concentrated toward a magnetic pole center position. Assuming here that a total angle occupied by the group of magnets constituting one magnetic pole is a magnet occupying circumferential angle θ1 in terms of an electrical angle, the inventors have found that various characteristics of the rotating electric machine can be remarkably improved by setting the magnet occupying circumferential angle θ1 to a proper value. This point will be described below in more detail.

Figure 2:
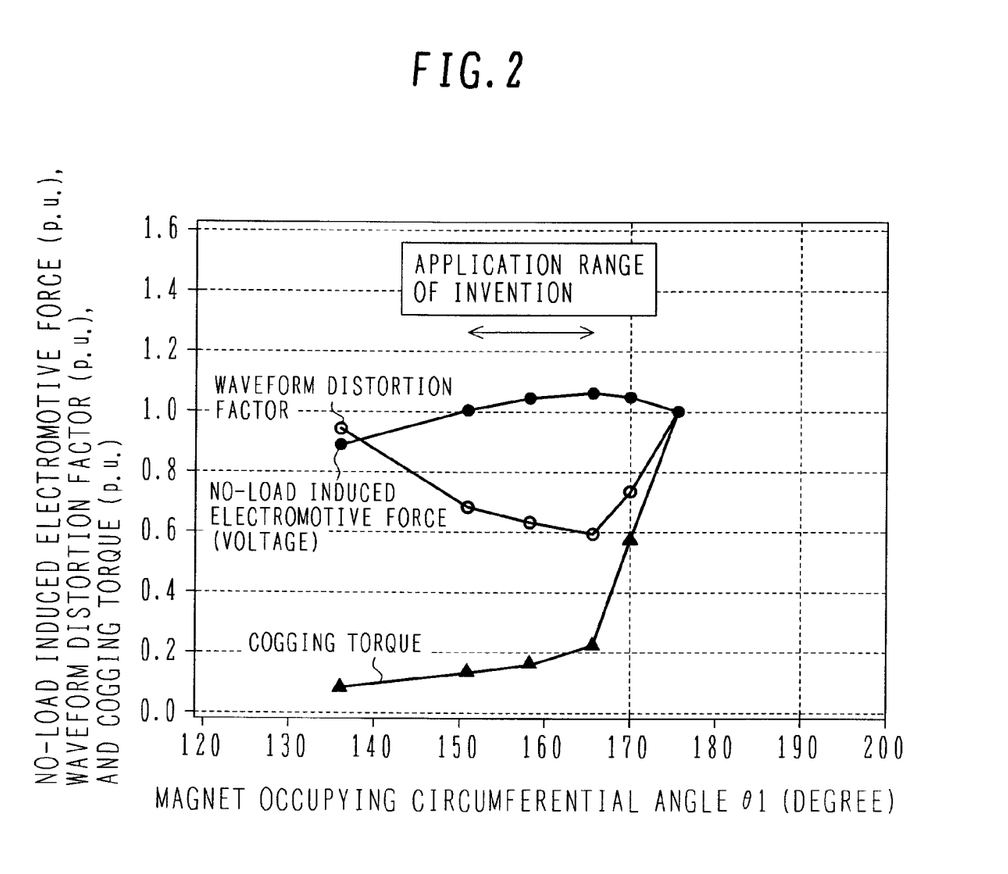
FIG. 2 is a graph for explaining various characteristics of the rotating electric machine when a magnet occupying circumferential angle θ1 is changed.
Figure 10:
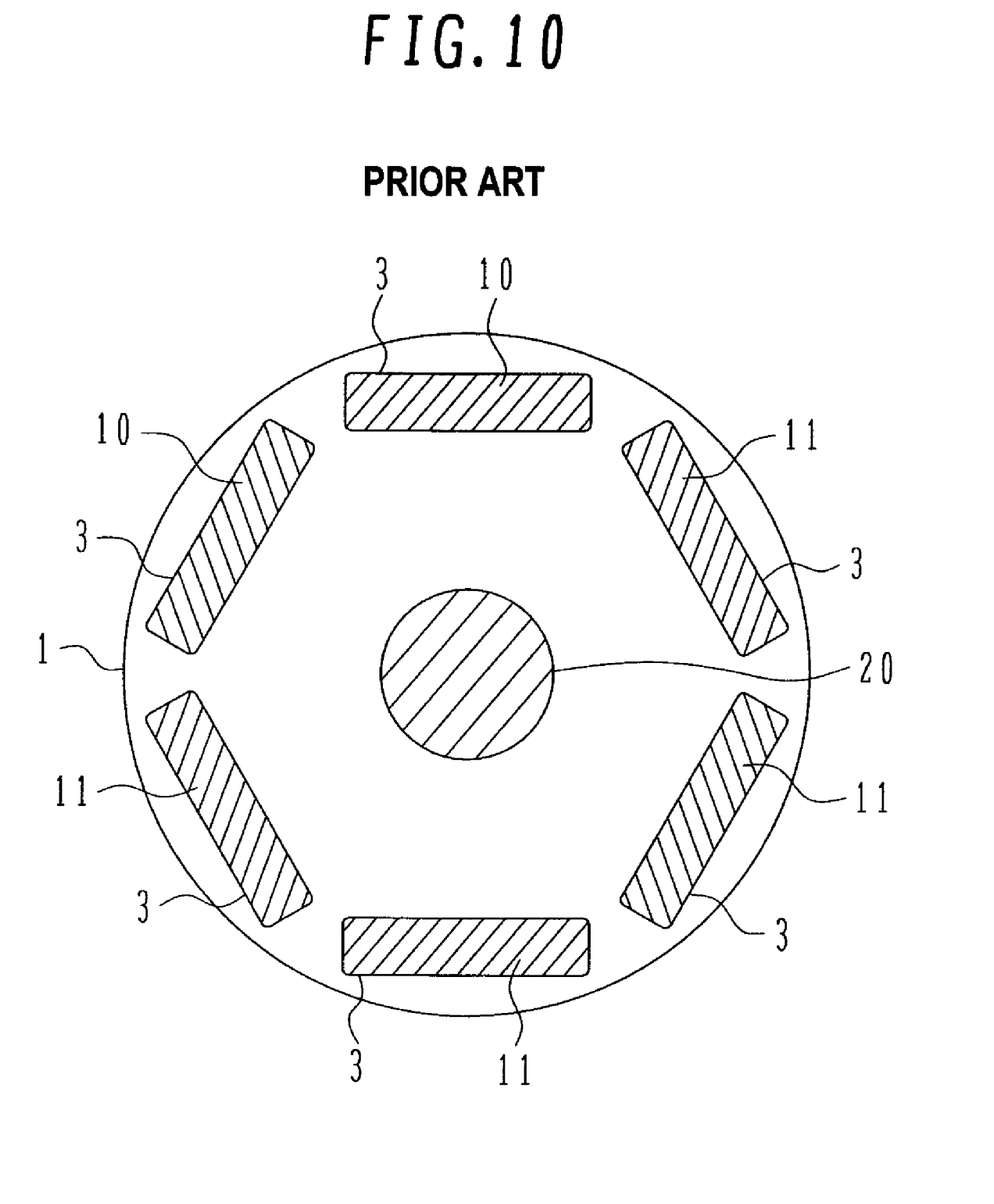
FIG. 10 is a sectional view of a known motor in which the magnets are prepared in groups, each constituting one magnetic pole.

FIG. 2 shows various characteristics of the rotating electric machine, i.e., the no-load induced electromotive force, the distortion factor of the no-load induced electromotive force waveform, and the cogging torque, versus the magnet occupying circumferential angle θ1 when the rotating electric machine is operated as a generator. In the prior art, as shown in FIG. 10, magnets prepared in groups each constituting one magnetic pole are regularly arranged, and the circumferential angle θ1 occupied by the magnets per magnetic pole has a value close to 180 degrees. For comparison with the prior art, FIG. 2 shows examination results when the magnet occupying circumferential angle θ1 is set in the range of 135 to 175 degrees on an assumption that the magnet occupying circumferential angle θ1 in the prior art is 175 degrees, and the examination results obtained while changing the magnet occupying circumferential angle θ1 are plotted on the basis of the reference results obtained when the magnet occupying circumferential angle θ1 is 175 degrees.

As seen from FIG. 2, the range of the magnet occupying circumferential angle θ1 in which the no-load induced electromotive force closely related to efficiency of the permanent magnet rotating electric machine is larger than that in the prior art, and in which the distortion factor of the no-load induced electromotive force waveform playing as an important factor in the function of the generator and the cogging torque affecting vibration and noise of the rotating electric machine are both smaller than those in the prior art, is from 150 degrees to a value less than an 175 degrees. As also seen from FIG. 2, however, the distortion factor of the no-load induced electromotive force waveform and the cogging torque are abruptly increased when the magnet occupying circumferential angle θ1 exceeds 165 degrees. When trying to suppress mechanical vibration and noise, therefore, it is appropriate to set an upper limit of the magnet occupying circumferential angle θ1 to 165 degrees. For that reason, the present invention defines the range of 150 to 165 degrees as an optimum range of the magnet occupying circumferential angle θ1.

Figure 3:
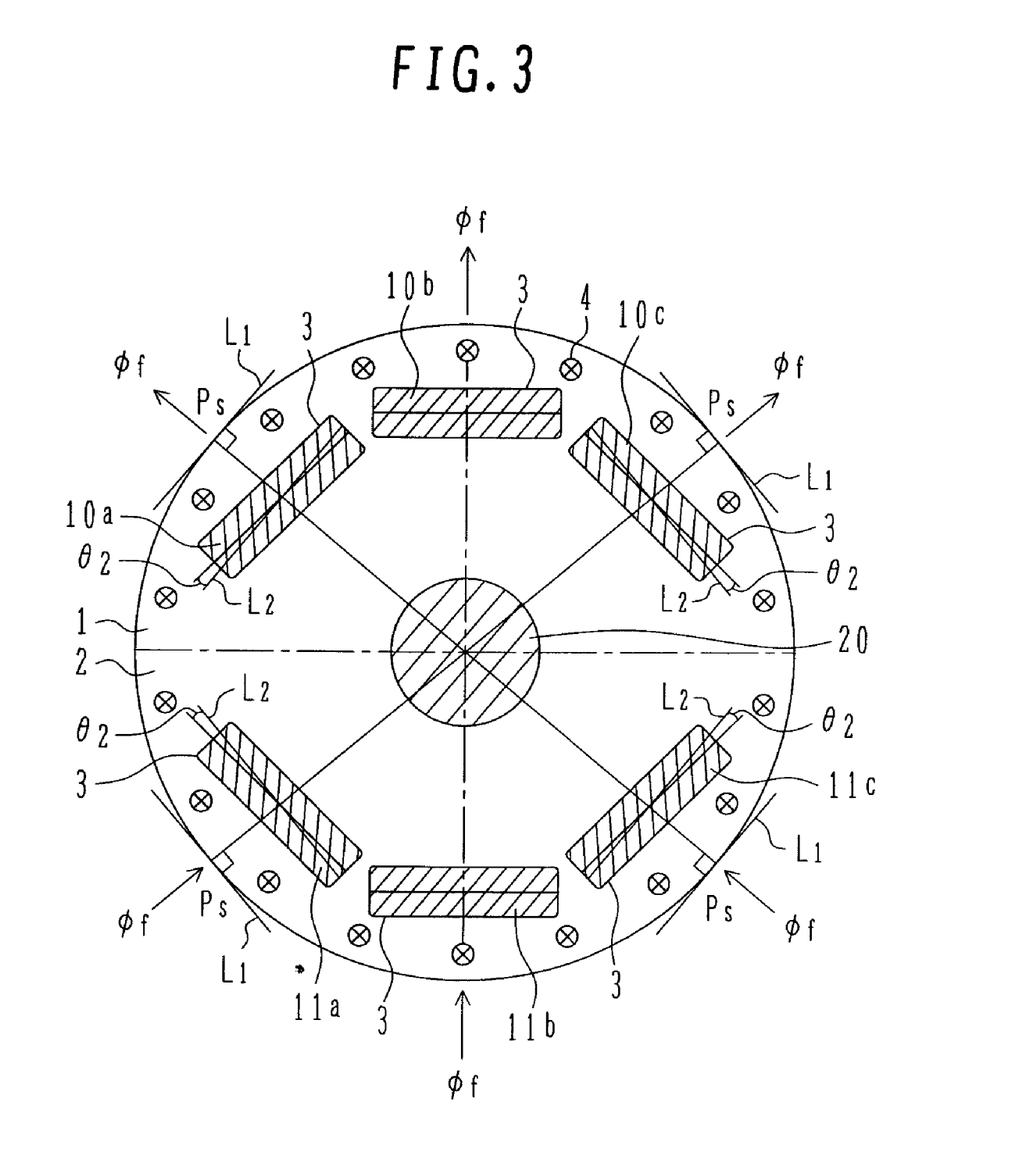
FIG. 3 is a sectional view showing the structure of another embodiment of the rotor of the permanent magnet rotating electric machine according to the present invention.

FIG. 3 shows the structure of a rotor 1 of a permanent magnet rotating electric machine, which represents another embodiment of the rotating electric machine according to the present invention. The rotor 1 comprises a rotor core 2, slots 3 in which magnets are disposed, N-pole permanent magnets 10 (10a, 10b and 10c), S-pole permanent magnets 11 (11a, 11b and 11c), a rotary shaft 20, and a plurality of damper windings 4 circumferentially disposed outside the magnets 10, 11. The rotor core 2 is a cylindrical laminated core formed by laminating a plurality of thin iron sheets one above another, which are each punched in a predetermined shape.

The N-pole permanent magnets 10 and the S-pole permanent magnets 11 are each a magnet generating magnetic flux Φf and are grouped in unit of three magnets per magnetic pole. In these magnet groups, each of the magnets 10a, 10c, 11a and 11c positioned on the respective magnetic pole end sides is arranged so as to incline toward the magnetic pole center, position. Assuming here, as shown in FIG. 3, that an angle at which the magnet is inclined toward the magnetic pole center position, i.e., an angle formed between the magnet and a line L1 (=L2) tangential to a point Ps at which a straight line passing both the center of the rotary shaft and the center of the magnet crosses the outer circumferential surface of the rotor core 2, is a magnet inclination angle θ2, the inventors have found that various characteristics of the rotating electric machine can be remarkably improved by setting the magnet inclination angle θ2 to a proper value. This point will be described below in more detail.

Figure 4:
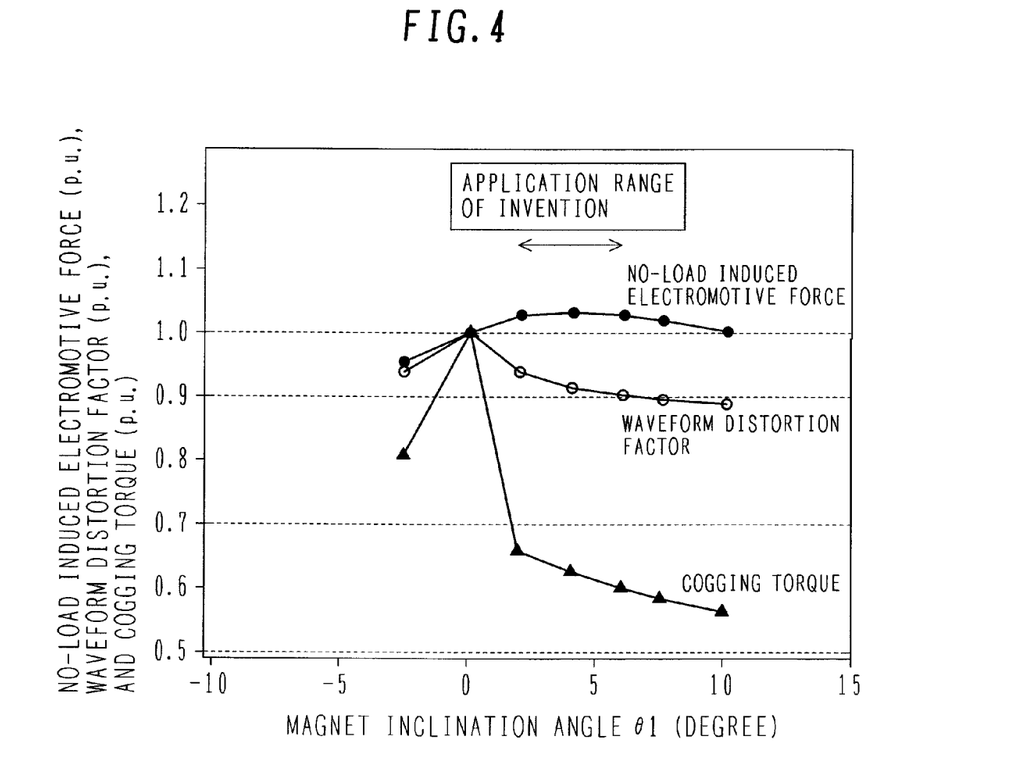
FIG. 4 is a graph for explaining various characteristics of the rotating electric machine when an angle θ2 at which the magnet is inclined toward a magnetic pole center position is changed.

FIG. 4 shows various characteristics of the rotating electric machine, i.e., the no-load induced electromotive force, the distortion factor of the no-load induced electromotive force waveform, and the cogging torque, versus the magnet inclination angle θ2 when the rotating electric machine is operated as a generator. Taking into account that the magnet inclination angle θ2 in the prior art is 0.0 degree, examination results obtained while changing the magnet inclination angle θ2 are plotted on the basis of the reference results obtained when the magnet inclination angle θ2 is 0.0 degree. Note that the sign of the magnet inclination angle is positive when the magnet is inclined toward the magnetic pole center position.

As a result of examining the various characteristics with the magnet inclination angle θ2 changed in the range of −2.5 to 10.0 degrees, as seen from FIG. 4, the no-load induced electromotive force is increased in the angle range of 0.0 degree <θ2<10.0 degrees. Also, seen from FIG. 4, the distortion factor of the no-load induced electromotive force waveform and the cogging torque are both reduced over the whole examination range of −2.5 to 10.0 degrees except for 0 degree. It is thus understood that when the magnet inclination angle θ2 is in the range of 0.0 degree<θ2<10.0 degrees, conditions of providing a larger no-load induced electromotive force, a smaller distortion factor of the no-load induced electromotive force waveform, and a smaller cogging torque than those given as the reference characteristics obtained at the magnet inclination angle θ2 of 0.0 degree are all satisfied at the same time. In other words, by orienting the magnet arranged on the magnetic pole end side so as to slightly incline in the positive direction, the various characteristics of the rotating electric machine can be improved in comparison with the case of not inclining the magnet. Further, as seen from FIG. 4, the no-load induced electromotive force closely related to efficiency of the permanent magnet rotating electric machine is almost maximized when the magnet inclination angle θ2 is set in the range of 2 to 6 degrees. In consideration of the above results, the present invention defines the range of 2.0 to 6.0 degrees as an optimum range of the magnet inclination angle θ2.

Figure 5:
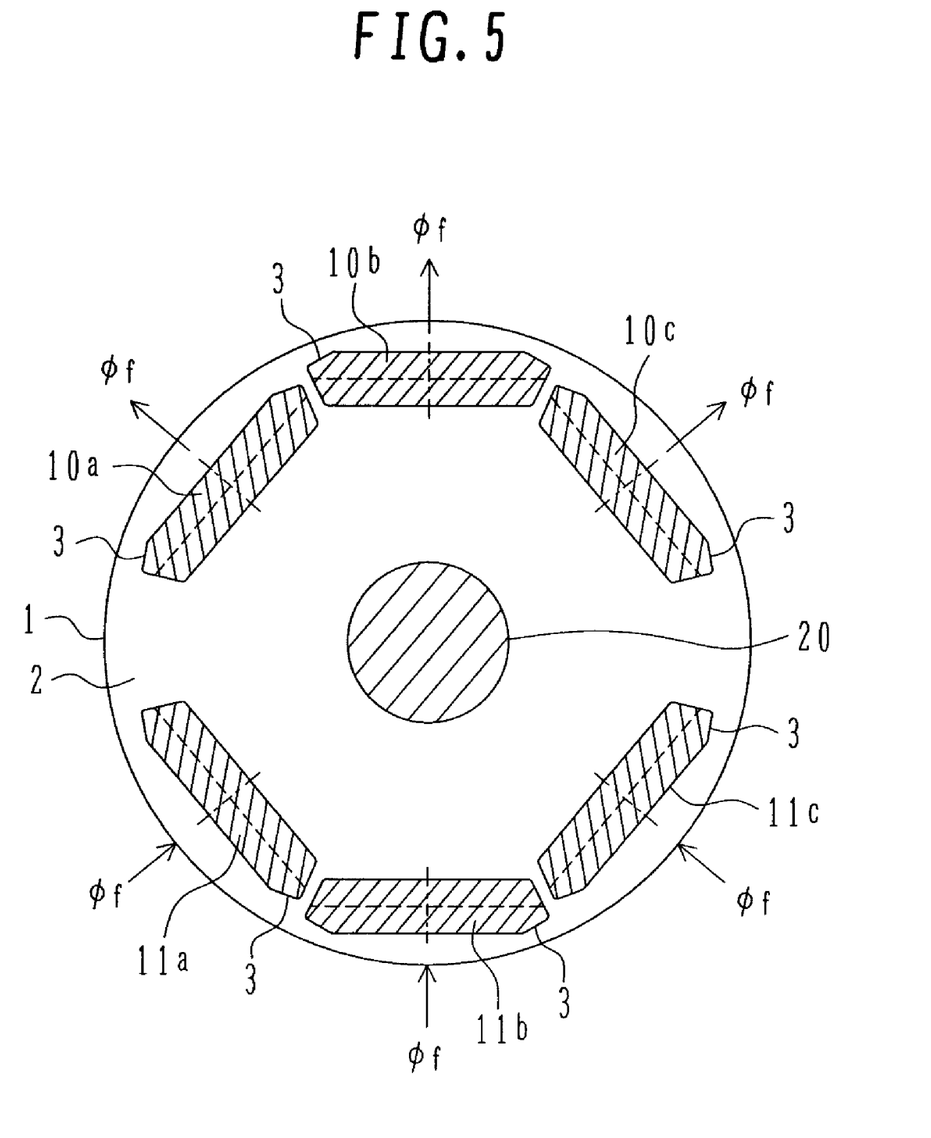
FIG. 5 is an explanatory view of a rotor structure representing still another embodiment of the present invention.

Thus, when at least one of the magnet occupying circumferential angle θ1 and the magnet inclination angle θ2 satisfies the condition of the angle range defined above in this embodiment, the various characteristics of the rotating electric machine can be improved. Also, it is a matter of course that, by setting both the magnet occupying circumferential angle θ1 and the magnet inclination angle θ2 so as to satisfy the respective angle ranges described above, the various characteristics of the rotating electric machine can be further improved as the result of a synergetic effect. Additionally, even when the damper windings 4 shown in FIGS. 1 and 3 are not disposed as shown in FIG. 5, the advantages of the present invention are ensured without being impaired. The case of FIG. 5 is further advantageous in that, because the production cost is reduced corresponding to elimination of the damper windings, the rotating electric machine can be manufactured at a lower cost. While FIGS. 2 and 4 show the characteristics when the rotating electric machine is operated as a generator, the advantages of the present invention can also be achieved when the rotating electric machine is operated as a motor. More specifically, when the rotating electric machine is operated as a motor, the present invention is advantageous in reducing the startup current and vibration at startup because the cogging torque and the distortion factor of the induced electromotive force waveform are reduced.

Figure 6:
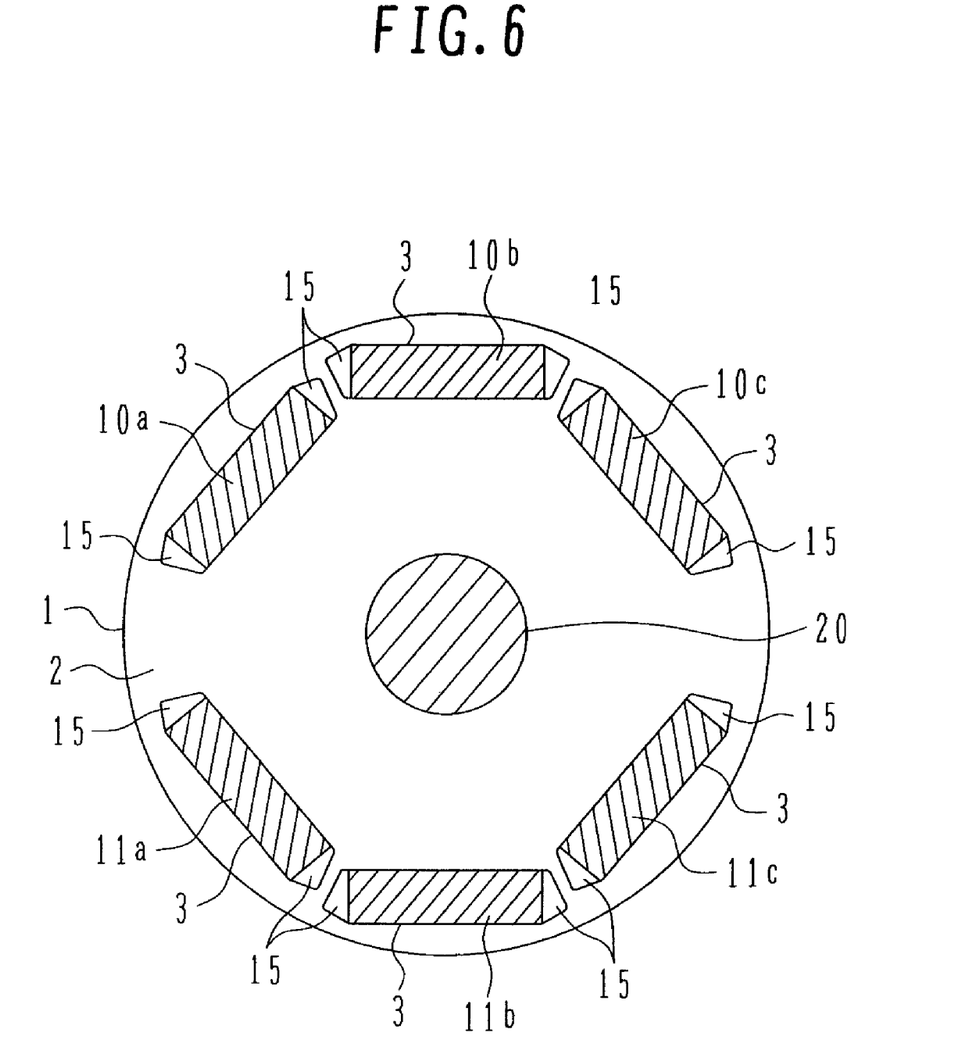
FIG. 6 is an explanatory view of a rotor structure representing still another embodiment of the present invention.

FIG. 6 is an explanatory view of a rotor structure representing still another embodiment of the present invention. In this embodiment, the slots 3 are shaped such that, when the magnets 10, 11 are disposed in the slots 3, slits 15 are formed between adjacent two of the magnets 10, 11. The slits 15 act to reduce the leakage magnetic flux generated between adjacent two of the magnets 10, 11 even if the slits 15 are filled with air (namely, even if they are left vacant), thus resulting in the advantage that the utilization efficiency of the magnets is increased. As an alternative, a magnetic fixing material, e.g., a resin or an adhesive, may be sealed in the slits 15 such that the magnetic fixing material infiltrates into gaps between the magnets 10, 11 and the rotor core 2. The sealing-in of the magnetic fixing material is effective in not only firmly fixing the magnets 10, 11 and the rotor core 2 together, thereby preventing deformation of the rotor core 2 and scatter of the magnets 10, 11, in particular, when the centrifugal force is increased due to high-speed rotation, but also in enhancing reliability of the rotor 1. Although the damper windings are not shown in FIG. 6, it is needless to say that the advantage of this embodiment can also be obtained when the damper windings are present.

Figure 7:
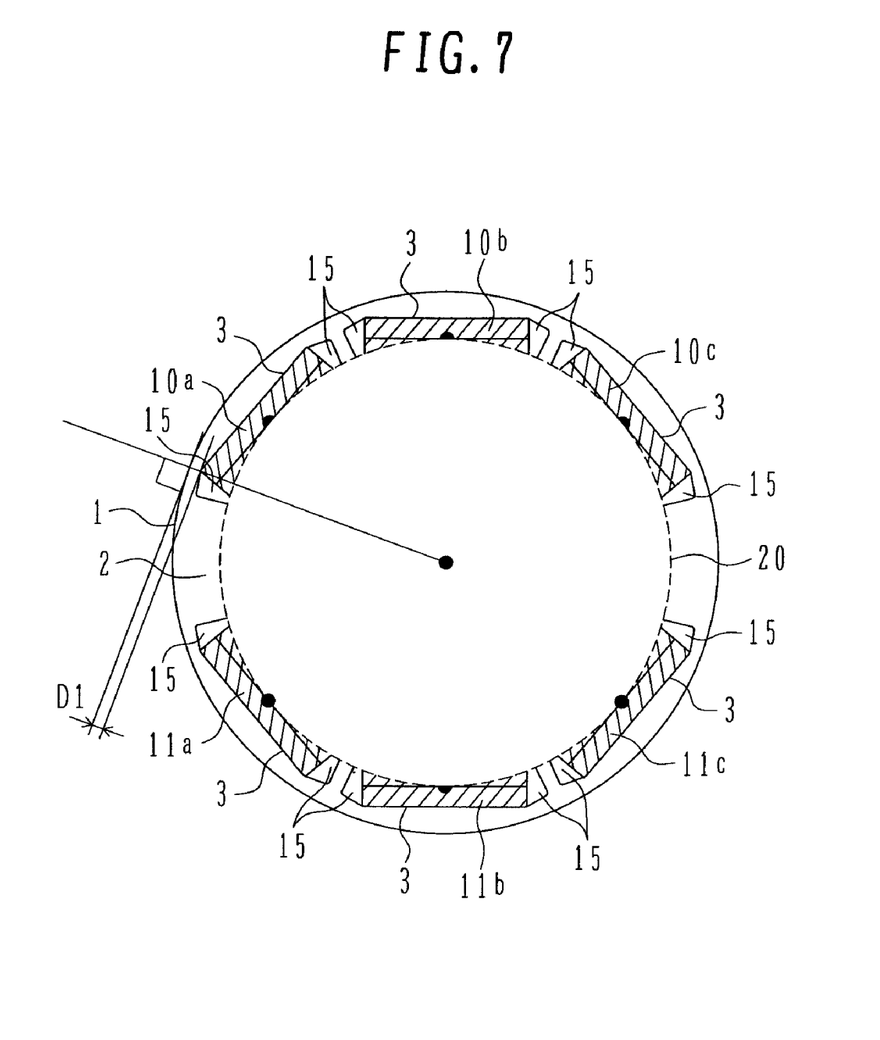
FIG. 7 is a detailed view showing the layout of center positions of the magnets, which represents the embodiment of the present invention.

FIG. 7 shows, in more detail, the layout of center positions of the magnets described above. The center positions of the plurality of magnets constituting the magnetic pole are located on the circular arc, and the magnet arranged on the magnetic pole end side is inclined toward the magnetic pole center position. Therefore, an outer peripheral wall thickness D1 of the rotor core is reduced as the magnet inclination angle θ2 increases. When the rotational speed is on the order of several thousands rotations, the centrifugal force imposed on the magnet is relatively small. Thus, even if the outer peripheral wall thickness D1 of the rotor core is about 0.5 mm, the magnet is securely held fixed and there are no problems from the viewpoint of mechanical strength. At the rotational speed on the order of several ten thousands rotations, however, a large centrifugal force is imposed on the magnet, and hence the outer peripheral wall thickness D1 of the rotor core must be properly adjusted. The mechanical strength of an outer peripheral portion of the rotor adjacent to the magnet can be enhanced by arranging the magnet in a position radially more inward of the rotor. Just by arranging the magnet in a position radially more inward of the rotor, however, the magnetic flux leaking to an core portion adjacent to the magnet is increased and the characteristics of the rotating electric machine are deteriorated. In other words, the outer peripheral wall thickness D1 of the rotor core has a proper value from the viewpoints of enhancing the mechanical strength and avoiding deterioration in the characteristics of the rotating electric machine. A description is now made of the magnet layout in the rotor which is effective in enhancing the mechanical strength without hardly deteriorating the characteristics of the rotating electric machine, and of examination results of the outer peripheral wall thickness D1 of the rotor core.

Figure 8:
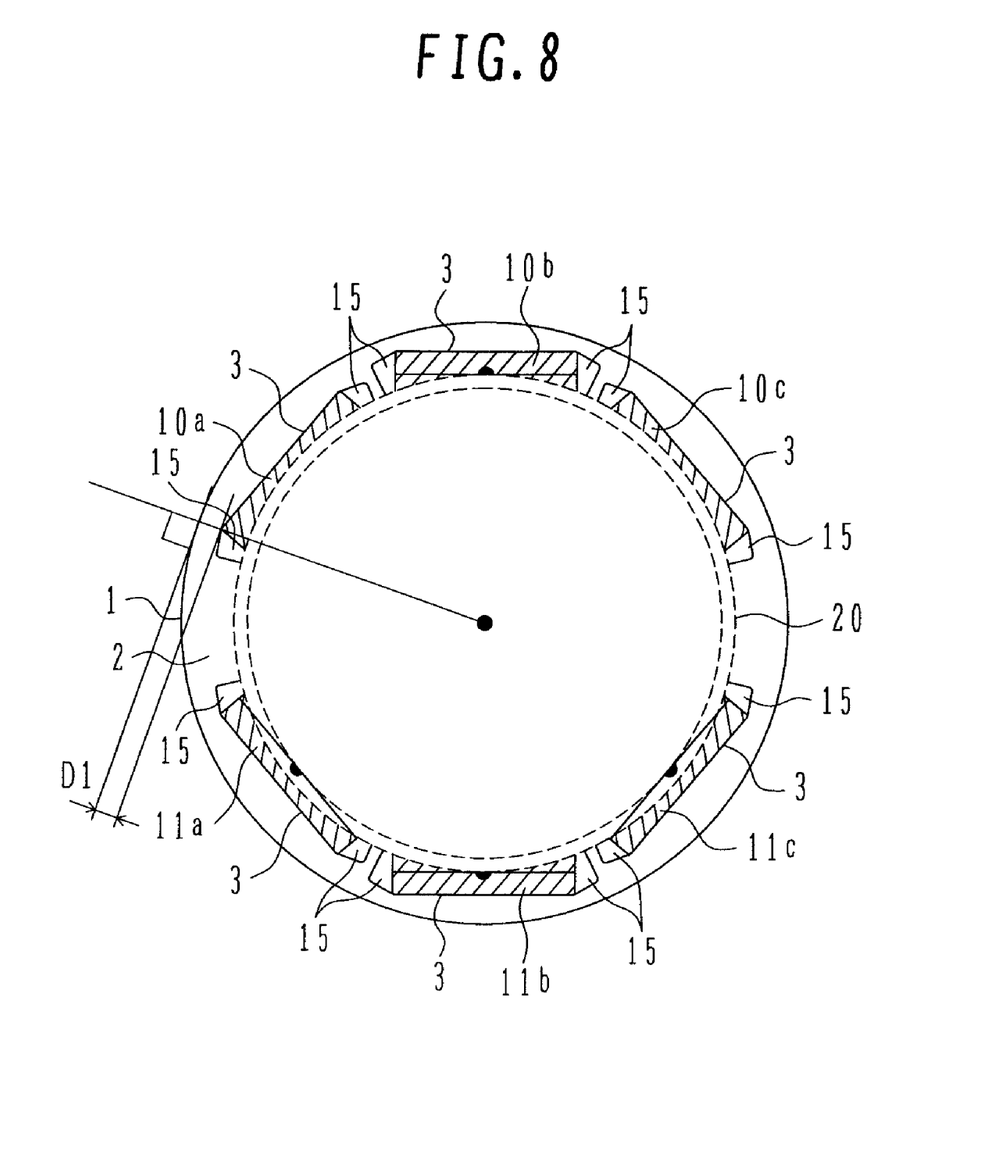
FIG. 8 is a detailed view showing the layout of center positions of the magnets, which represents still another embodiment of the present invention.

FIG. 8 is an explanatory view of a rotor structure which represents still another embodiment of the present invention. In this embodiment, the magnet arranged on the magnetic pole end side is shifted radially inward of the rotor so that the rotor is endurable against the centrifugal force even at the rotational speed on the order of several ten thousands rotations, while keeping the magnet occupying circumferential angle θ1 and the magnet inclination angle θ2 within the respective setting ranges. Stated another way, the plurality of magnets are arranged in the rotor core such that a circular arc passing the centers of the magnets arranged on the magnetic pole end sides has a smaller diameter than a circular arc passing the centers of the magnets arranged on the magnetic pole center sides.

Figure 9:
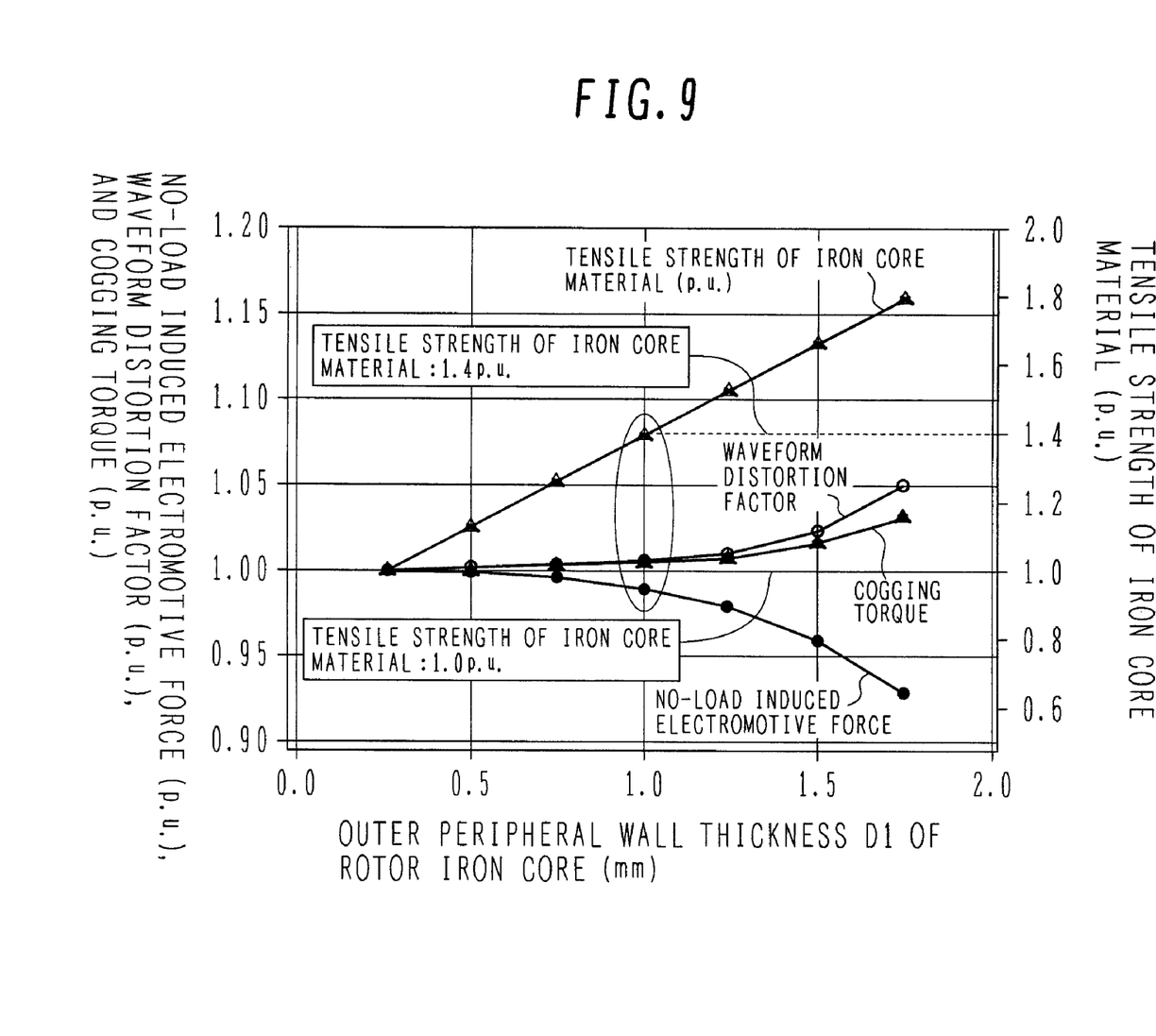
FIG. 9 is a graph showing examination results of centrifugal force resistance and various characteristics of the rotating electric machine when an outer peripheral wall thickness D1 of a rotor core is changed.

FIG. 9 shows examination results of centrifugal force resistance and various characteristics of the rotating electric machine when the outer peripheral wall thickness D1 of the rotor core is changed. Increasing the outer peripheral wall thickness D1 of the rotor core means that the circular arc, shown in FIG. 8, passing the centers of the magnets arranged on the magnetic pole end sides is set to be even smaller diameter than the circular arc passing the centers of the magnets arranged on the magnetic pole center sides. For comparison, the examination results of the various characteristics are plotted for the outer peripheral wall thickness D1 of the rotor core in the range of 0.25 to 1.75 mm on the basis of the reference results obtained when the outer peripheral wall thickness D1 is 0.25 mm.

As seen from FIG. 9, the centrifugal force resistance is increased as the outer peripheral wall thickness D1 of the rotor core increases. The no-load induced electromotive force is constant for the outer peripheral wall thickness D1 of the rotor core in the range of 0.25 to 1.0 mm, but it abruptly decreases when the outer peripheral wall thickness D1 exceeds 1.0 mm. The distortion factor of the no-load induced electromotive force is substantially constant for the outer peripheral wall thickness D1 of the rotor core in the range of 0.25 to 1.0 mm, but it has a tendency to increase when the outer peripheral wall thickness D1 exceeds 1.0 mm. Further, the cogging torque has a tendency to increase as the outer peripheral wall thickness D1 of the rotor core increases. Taking into account factors deteriorating the centrifugal force resistance, such as the manufacturing error and the repeated stress, it is here assumed that the centrifugal force resistance should be 1.4 times the centrifugal force in consideration of the safety factor. Based on those examination results, the outer peripheral wall thickness D1 of the rotor core is set to 1.0 mm at which satisfactory characteristics of the rotating electric machine and a sufficient level of the centrifugal force resistance can be obtained.

The above embodiments of the present invention have been described, by way of example, in connection with the case using the magnet in the form of a simple flat plate. The use of the magnet in the form of a simple flat plate is advantageous in reducing the machining cost and the material cost of the magnet as compared with the case using an arc-shaped magnet because the simple flat magnet is easier to machine for manufacturing thereof and the utilization factor of parent material (i.e., yield) is increased in the magnet manufacturing process.

INDUSTRIAL APPLICABILITY

According to the present invention, a permanent magnet rotating electric machine having high performance and high efficiency and being inexpensive can be provided.

The invention claimed is:

1. A rotating electric machine comprising:
a stator provided with a plurality of windings;
a rotor core rotatably supported on a rotary shaft inside said stator; and
a plurality of magnets disposed in slots formed in said rotor core,
wherein a number of magnet poles is two,
each said magnet pole comprises at least three magnets,
said at least three magnets of a first of the magnet poles are arranged so as to be concentrated on one side across the rotary shaft,
said at least three magnets of a second of the magnet poles are arranged so as to be concentrated on the other side across the rotary shaft, and
wherein a circumferential angle occupied by the magnets constituting one of the magnet poles is in a range of 150 to 165 degrees in terms of an electrical angle.

2. A rotating electric machine according to claim 1, wherein said slots are shaped such that slits are formed between two adjacent magnets of said plurality of magnets.

3. A rotating electric machine according to claim 2, wherein a magnet fixing material is sealed in said slits.

4. A rotating electric machine according to claim 1, wherein each of said magnets is in the form of a simple flat plate.

* * * * *